(12) United States Patent
Pavlov et al.

(10) Patent No.: US 11,486,171 B2
(45) Date of Patent: Nov. 1, 2022

(54) MILITARY VEHICLE DOOR QUICK-RELEASE MECHANISM

(71) Applicant: GOVERNMENT OF THE UNITED STATES, AS REPRESENTED BY THE SECRETARY OF THE ARMY, Washington, DC (US)

(72) Inventors: Kirill Pavlov, Southfield, MI (US); William E. Johnson, Davison, MI (US)

(73) Assignee: Government of the United States, as Represented by the Secretary of the Army, Washington, DC (US)

( * ) Notice: Subject to any disclaimer, the term of this patent is extended or adjusted under 35 U.S.C. 154(b) by 811 days.

(21) Appl. No.: 16/440,182

(22) Filed: Jun. 13, 2019

(65) Prior Publication Data

US 2020/0392770 A1 Dec. 17, 2020

(51) Int. Cl.
| | | |
|---|---|---|
| E05B 81/90 | (2014.01) | |
| E05B 83/00 | (2014.01) | |
| E05B 63/00 | (2006.01) | |
| E05B 79/12 | (2014.01) | |
| E05B 81/10 | (2014.01) | |
| B60J 5/04 | (2006.01) | |
| F41H 7/02 | (2006.01) | |
| E05B 79/02 | (2014.01) | |
| E05B 85/10 | (2014.01) | |
| E05B 51/02 | (2006.01) | |

(52) U.S. Cl.
CPC ............ *E05B 81/90* (2013.01); *B60J 5/0486* (2013.01); *E05B 51/02* (2013.01); *E05B 63/0069* (2013.01); *E05B 79/02* (2013.01); *E05B 79/12* (2013.01); *E05B 81/10* (2013.01); *E05B 83/01* (2013.01); *E05B 85/10* (2013.01); *F41H 7/02* (2013.01); *E05Y 2900/504* (2013.01)

(58) Field of Classification Search
CPC .. E05B 51/02; E05B 63/0065; E05B 63/0069; E05B 79/02; E05B 79/12; E05B 81/10; E05B 81/90; E05B 83/01; E05Y 29/00; E05Y 29/504; B60J 5/0486; F41H 7/02
See application file for complete search history.

(56) References Cited

U.S. PATENT DOCUMENTS

| | | | | |
|---|---|---|---|---|
| 3,113,447 | A * | 12/1963 | Oishei ..................... | E05B 81/52 292/201 |
| 5,595,076 | A * | 1/1997 | Weinerman ............... | E05B 5/00 292/DIG. 31 |
| 7,237,812 | B2 * | 7/2007 | Tweedy .................... | E05B 5/00 292/DIG. 31 |
| 7,360,803 | B2 * | 4/2008 | Parent ...................... | E05B 81/14 292/216 |

(Continued)

*Primary Examiner* — Christopher J Boswell

(57) ABSTRACT

One example embodiment is an armored vehicle door quick-release mechanism includes a handle, a slide lock latch, and an actuator mechanism. The handle is coupled to the slide lock latch. The movement of the handle in a first direction causes the slide lock latch to move in a first direction to a first position so that the slide lock latch is adapted to attach the vehicle door to the actuator mechanism adapted to open and close the vehicle door. A movement of the handle in a second direction causes that slide lock latch to move in a second direction to a second position to detach the vehicle door from the actuator mechanism.

20 Claims, 10 Drawing Sheets

(56) References Cited

U.S. PATENT DOCUMENTS

| | | | | |
|---|---|---|---|---|
| 7,967,347 B1* | 6/2011 | Johnson | .................. | E05B 83/12 |
| | | | | 292/201 |
| 8,186,191 B2* | 5/2012 | Bacon | ..................... | E05B 81/25 |
| | | | | 292/201 |
| 8,393,187 B2* | 3/2013 | Bacon | ..................... | E05B 81/08 |
| | | | | 292/216 |
| 8,807,603 B2* | 8/2014 | Niwa | ..................... | E05B 81/18 |
| | | | | 292/142 |
| 9,228,381 B2* | 1/2016 | Ban | ......................... | E05B 81/90 |
| 9,940,767 B2* | 4/2018 | Bacon | ..................... | E05B 81/82 |
| 11,149,472 B1* | 10/2021 | Tzarnotzky | ............. | E05B 81/90 |
| 2011/0241360 A1* | 10/2011 | Kitamura | ................ | E05B 81/90 |
| | | | | 292/201 |
| 2019/0054810 A1* | 2/2019 | Sawahata | ................ | E05B 81/90 |

* cited by examiner

MILITARY VEHICLE DOOR QUICK-RELEASE MECHANISM

GOVERNMENT INTEREST

The inventions described herein may be made, used, or licensed by or for the U.S. Government for U.S. Government purposes. The U.S. Government has rights in the invention(s).

TECHNICAL FIELD

An apparatus provides for a door quick-release mechanism for a military vehicle door. The door quick-release mechanism may provide a rapid system for entering, or exiting military vehicles that may have become disabled possibly from a hostile fire situation. In particular, a vehicle door quick-release mechanism provides an unpowered mechanical way of bypassing a hydraulic or other powered system that is preventing a door from opening to allow for that vehicle door to be opened.

BACKGROUND

Ground combat vehicles (GCVs), trucks and other military vehicles used in combat often have heavy doors that may be armored and require the use of powered systems such as actuator to open without requiring excessive muscle power. Unfortunately, these vehicles may come under hostile fire or may simply have components fail during normal operation. When a power system that is used to power components (actuators) that are used to open a vehicle door are damaged or fail, the door(s) of that vehicle become extremely difficult to open, especially when the vehicle is resting on an incline. What is need is a better way to open doors of military vehicles without placing crew members in hostile file any longer than may be necessary.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One example embodiment is an armored vehicle door quick-release mechanism. The armored vehicle door quick-release mechanism includes a handle, a handle plate, a slide lock arm, a slide lock latch, and a slide lock guide adapted to guide a movement of the slide lock latch. The armored vehicle door quick-release mechanism is adapted to quick release an armored vehicle door on an armored military vehicle from a vehicle power system that is used to open and close the armored vehicle door. The handle is coupled to the handle plate and the handle plate is rotatably coupled to the slide lock arm and the slide lock arm is attached to the slide lock latch. A rotation of the handle in a first direction causes that slide lock latch to move in the first direction to a first position within the slide lock guide. A rotation of the handle in a second direction causes that slide lock latch to move in a second direction to a second position within the slide lock guide. When the slide lock latch is in the first position, the armored vehicle door quick-release mechanism is adapted to couple the armored vehicle door on the armored military vehicle to the vehicle power system in a locked position that prevents manual opening and closing of the armored vehicle door. When the slide lock latch is in the second position, the armored vehicle door quick-release mechanism is uncoupled from the armored vehicle door to allow manual opening and closing of the armored vehicle door.

In another embodiment, an armored vehicle door quick-release mechanism includes a handle, a slide lock latch, and an actuator mechanism. The handle is coupled to the slide lock latch. A movement of the handle in a first direction causes that slide lock latch to move in a first direction to a first position so that the slide lock latch is adapted to attach the vehicle door to the actuator mechanism that is adapted to open and close the vehicle door. A movement of the handle in a second direction causes the slide lock latch to move in a second direction to a second position to detach the vehicle door from the actuator mechanism.

Another example is a method of quick-releasing an armored vehicle door from an actuator. The method begins by moving a slide lock latch into a first position so that the slide lock latch is adapted to lock the armored vehicle door to a rotating bracket plate assembly in a locked position. In the locked position, the slide lock latch overlaps a bracket plate of the rotating bracket plate assembly. The bracket plate assembly rotates to the locked position with the slide lock latch overlapping the bracket plate. The method then contracts the actuator, when the slide lock latch is in the first position and is in the locked position, to rotate the rotating bracket plate assembly in a first rotational direction to close the armored vehicle door. To disconnect the armored vehicle door from the actuator, the slide lock latch is moved into a second position to disconnect the armored vehicle door from the rotating bracket plate assembly. In the second position, the slide lock latch does not overlap the bracket plate.

The following description and the annexed drawings set forth in detail certain illustrative aspects of the subject matter. However, these aspects are indicative of some of the numerous ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

BRIEF DESCRIPTION OF THE DRAWINGS

One or more preferred embodiments that illustrate the best mode(s) are set forth in the drawings and in the following description. The appended claims particularly and distinctly point out and set forth the invention.

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples, one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
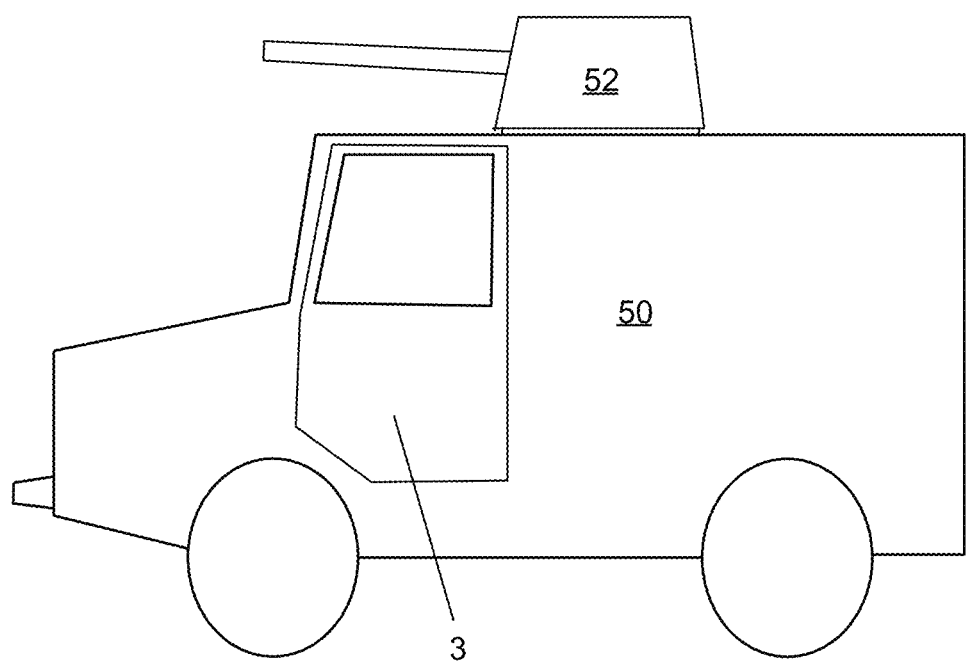
FIG. 1 illustrates one example embodiment of an armored military vehicle with an example door mounted on an armored vehicle.

FIG. 1 illustrates one example embodiment of an example door 3 mounted on an armored vehicle 50 for traveling over the ground. The armored vehicle 50 may travel over a surface with tires and/or continuous tracks. This example armored vehicle 50 is illustrated with an example gun turret 52 that may support a cannon, a gun, or other weapons. Even though a military/armored vehicle 50 is illustrated, in other embodiments, the door(s) 3 may be mounted on tracked vehicles, military trucks, light armored vehicles, heavy armored vehicles, a Bradley fighting vehicle, a Stryker vehicle, an armored personnel carrier, a high mobility multipurpose wheeled vehicle (Hummvee), a light armored vehicle (LAV), an assault amphibious vehicle, a combat support vehicle, a mine-protected vehicle, a utility vehicle, commercial trucks and other vehicles as understood by those of ordinary skill in the art.

Military vehicles often have very heavy armored doors 3 that may be difficult to impossible to open with the strength of a single person especially if the armored vehicle 50 is resting on an incline with gravity tending to close the door 3. Therefore, actuator/hydraulic systems or other powered systems are used to open and close and close doors 3 on military vehicles. Other example power systems for opening and closing a door can include linear style actuators or cylinders powered by electric, magnetic, hydraulic, pneumatics, and the like. When vehicles with a door assist mechanism fails, such as in hostile fire situation or due to inoperative actuators, power loss, hydraulic failure, or battle damage, those systems do not function and their corresponding doors 3 may be extremely difficult to open. A vehicle door quick-release mechanism 5 (FIG. 2) may provide a way of quickly disconnecting the door 3 from the powered door assist mechanism. Thus, an unpowered mechanical door quick-release mechanism 5 provides an unpowered mechanical way of disconnecting a non-responsive hydraulic or other type of door assist mechanism preventing the opening of the door 3. The armored vehicle door quick-release mechanism 5 may operate independently of mine/battle door locks. Once the door 3 is disconnected, the vehicle door 3 may be opened manually and/or in other unpowered mechanical ways without the use of hydraulic/powered systems.

Thus, the military vehicle door quick-release mechanism 5 provides a way to rapidly open a door 3 of a vehicle 50 when its power supply is not functional. Additionally, soldiers external to the military vehicle 50 may quickly release and open the door 3, using the military vehicle door quick-release mechanism 5, and rescue occupants of the vehicle 50 that may have become unconscious in battle or for other reasons. The speed of opening a door 3 and allowing quick access to the military vehicle 50 reduces the amount of time solders rescuing crew members inside the military vehicle 50 are targets outside of that vehicle, which reduces overall solder injuries and deaths.

In general, the components of the military vehicle door quick-release mechanism 5, as discussed herein, are formed with rigid materials. "Rigid material" is defined herein as any material that retains its shape when formed and that is not a liquid or a gas. Rigid material may be pre-formed into specific shapes such as C-channel, box-channel, as well as square and/or rectangular tubing and the like. For example, rigid materials include metal steel, aluminum, plastics, wood, carbon fiber based material, etc. Many of these components may be rigidly connected (rigidly mounted) with each other unless they clearly move with respect to each other or their movements are discussed herein. "Rigidly connected" or "rigidly mounted" is defined herein to mean that two or more materials are connected together by welding, fusion, bolts, glue, clamps and/or connected together in another way as understood by a person with ordinary skill in the art so that the connected components essentially do not move relative to each other.

Figure 2:
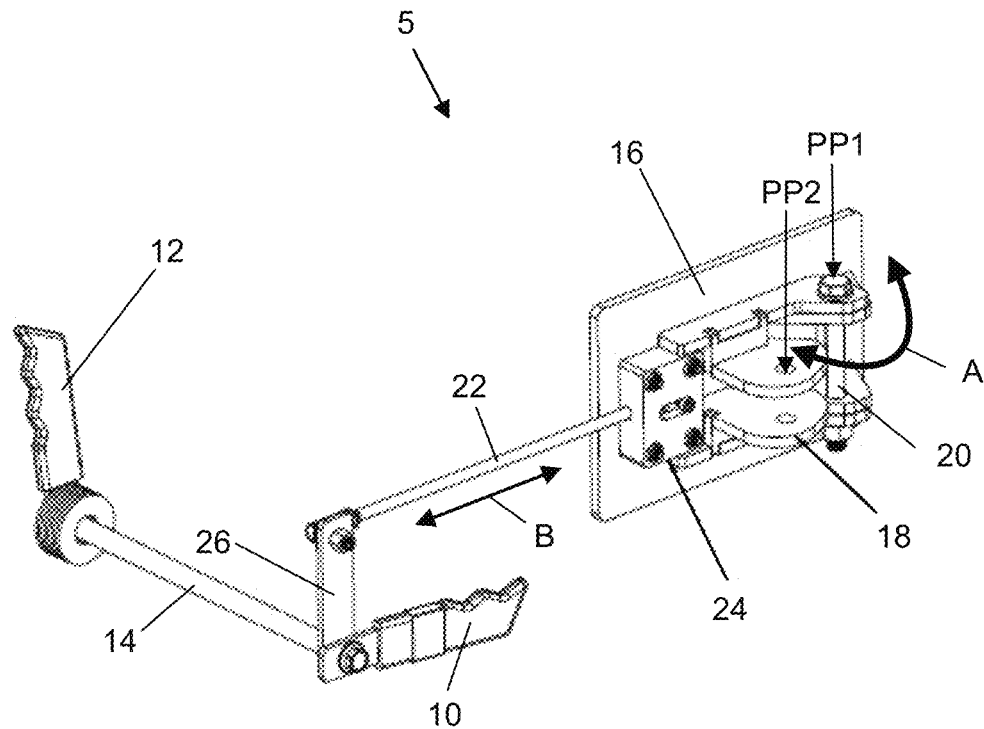
FIG. 2 illustrates one example embodiment of a perspective view of an armored vehicle door quick-release mechanism.
Figure 8:
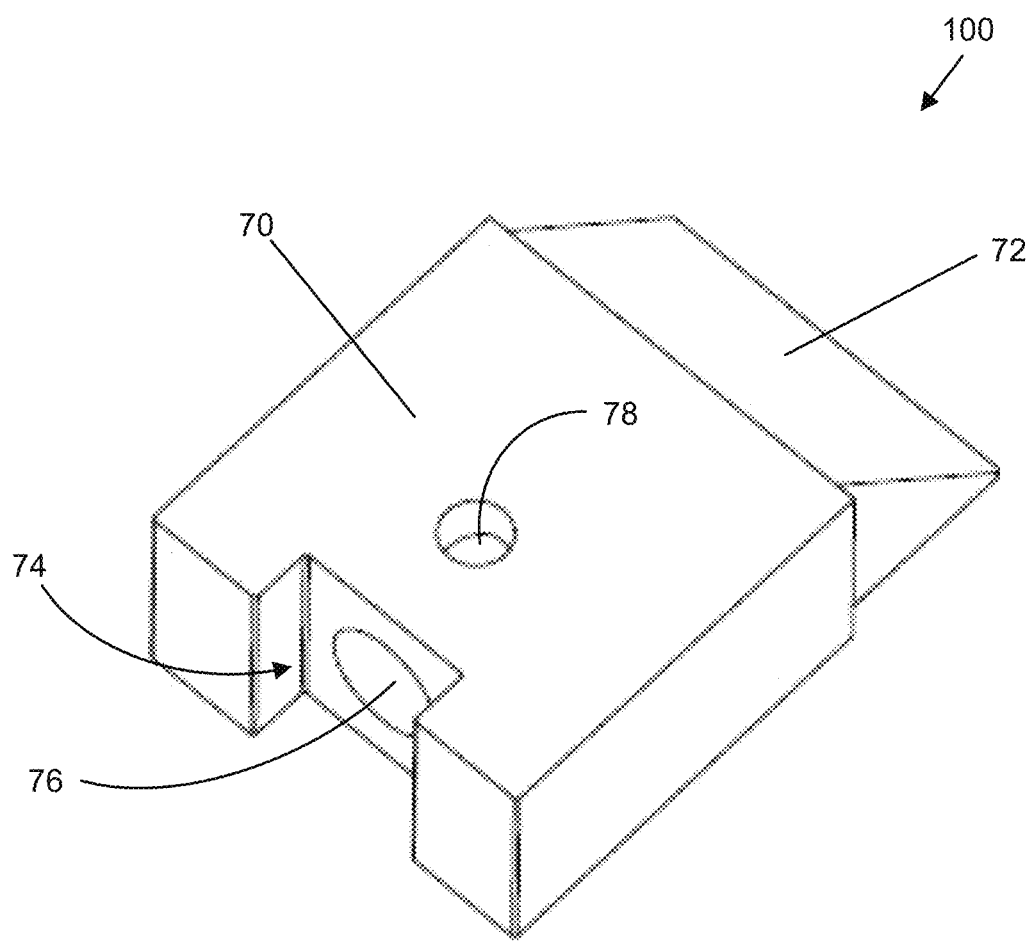
FIG. 8 illustrates one example perspective view of a slide lock latch.

The main components of the armored vehicle door quick-release mechanism 5 (FIGS. 2 and 3) include an inside handle 10, and outside handle 12, a handle shaft 14, a handle plate 26, a door mount assembly 16, a slide lock arm 22, a slide lock guide 24, and a slide lock latch 100 (FIG. 8). The armored vehicle door quick-release mechanism 5 interacts with a rotating interface that may be a rotating bracket plate assembly 18 rotating about a pivot cylinder 20. The pivot cylinder 20 passes through the door mount assembly 16 and a rotating bracket plate assembly 18, as illustrated in FIG. 2, to create a pivot point PP1 allowing the rotating bracket plate assembly 18 to rotate in the directions of arrows A with respect to the door mount assembly 16. In some configurations, the pivot cylinder may be a bolt or the like. The inside handle 10 is inside the armored vehicle 50 and is operable by crew members inside the armored vehicle 50 and the outside handle 12 is outside the armored vehicle 50 and is operable by personnel outside the armored vehicle 50. The handle shaft 14 passes through the vehicle door 3 and is rigidly connected to the two handles 12, 14. The door mount assembly 16 is ridged mounted to the armored vehicle door 3 with bolts, welding and/or in another way.

Figure 4:
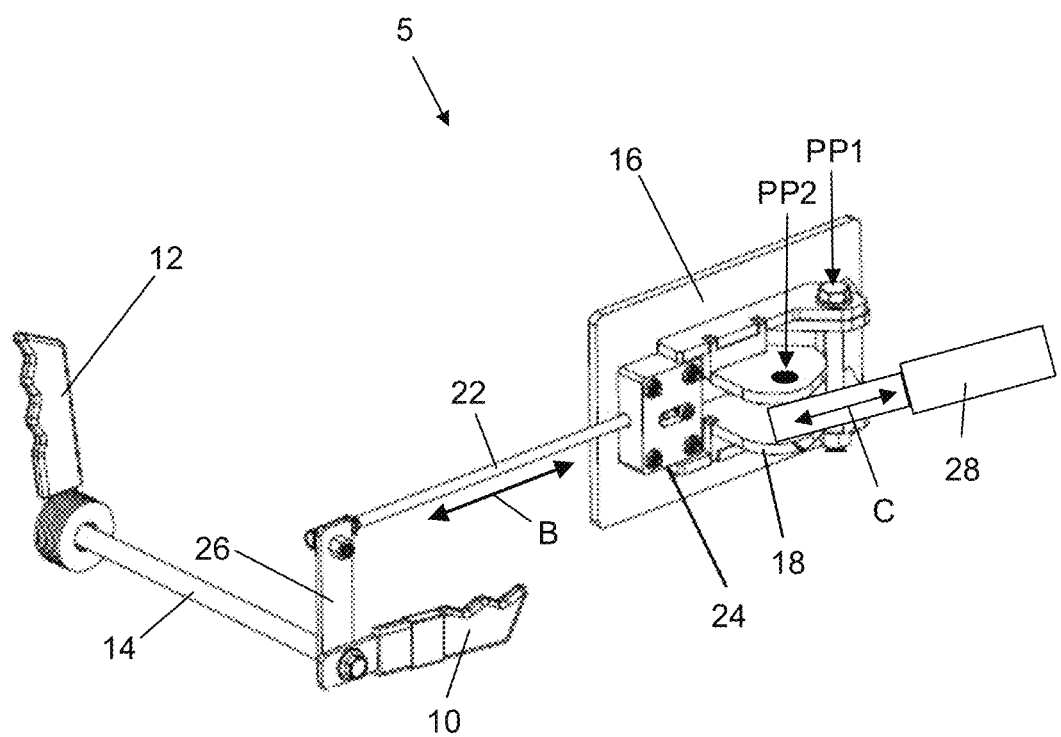
FIG. 4 illustrates one example configuration of a perspective view of the armored vehicle door quick-release mechanism connected to an actuator.

As discussed further below, the slide lock arm 22 is attached to a slide lock latch 100 at one end with the slide lock latch 100 located within the slide lock guide 24 (best seen in FIGS. 9 and 10) and is used to mechanically decouple the armored vehicle door 3 from the operation of a linear actuator 28 (FIG. 4). The linear actuator 28 is operated to move in the directions of arrow C (FIG. 4) and is pivotally attached to the rotating bracket plate assembly 18 at pivot point PP2 with a pin and causes the rotating bracket plate assembly 18 to pivot about pivot point PP1. Also further discussed below, the handles 10, 12 are used to cause the slide lock arm 22 to move in one of the directions of arrow B. This movement can be used to pull the slide lock latch 100 as discussed below to unlock from a latch plate 102 (FIGS. 5, 9-10) on the rotating bracket plate assembly 18.

Figure 5:
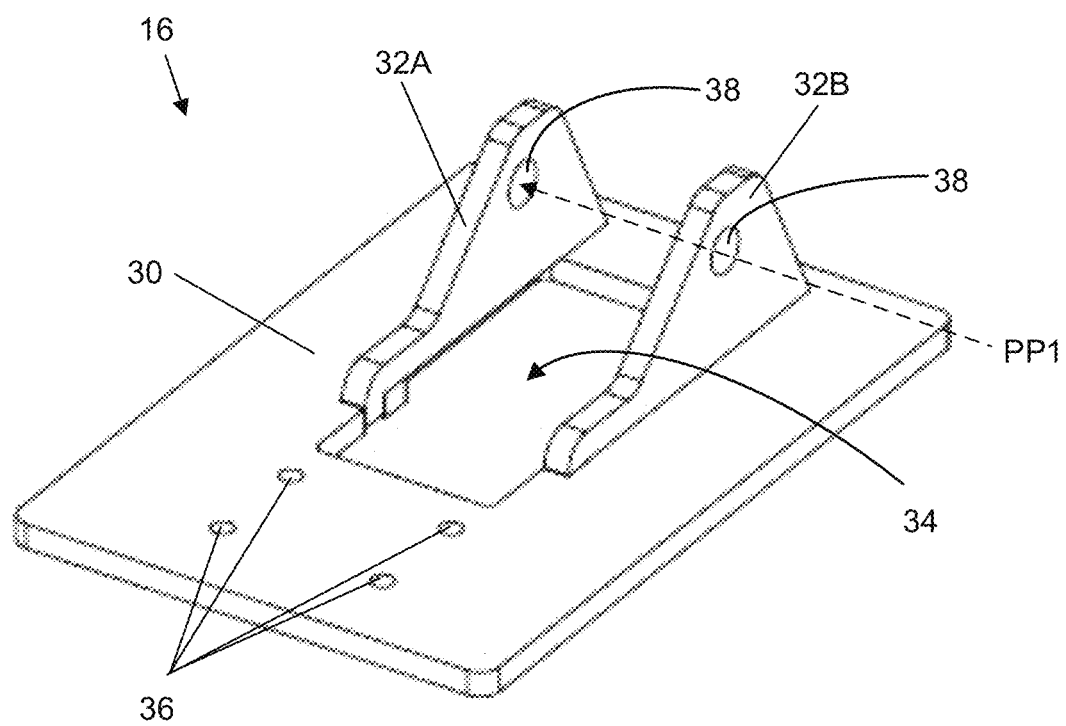
FIG. 5 illustrates one example perspective view of an example door mount assembly.

FIG. 5 illustrates an example door mount assembly 16. This assembly 16 is a solid piece of material such as a metal. The door mount assembly 16 has a base plate 30, and a pair of flanges 32A, 32B. The base plate 30 and the pair of flanges 32A, 32B may be machined/manufactured separately and then attached buy welding or by another suitable way. In some configurations, the base plate 30 may be generally rectangular in shape with a size of about 9.5 by 6.375 inches. The flanges 32A, 32B extend outward from the base plate 30 while straddling a generally rectangular shaped opening 34 formed in the base plate 30 as illustrated. The flanges 32A, 32B may also have angled edgers with respect the generally planar base plate 30. Four holes 36 pass through the base plate 30 to provide a way of bolting or attaching the slide lock guide 24 to the base plate 30 in a suitable rigid way. Holes 38 pass through top ends of the flanges 32A, 32B providing a way to pass the pivot cylinder 20 through the flanges 32A, 32B to create the pivot point PP1.

Figure 6:
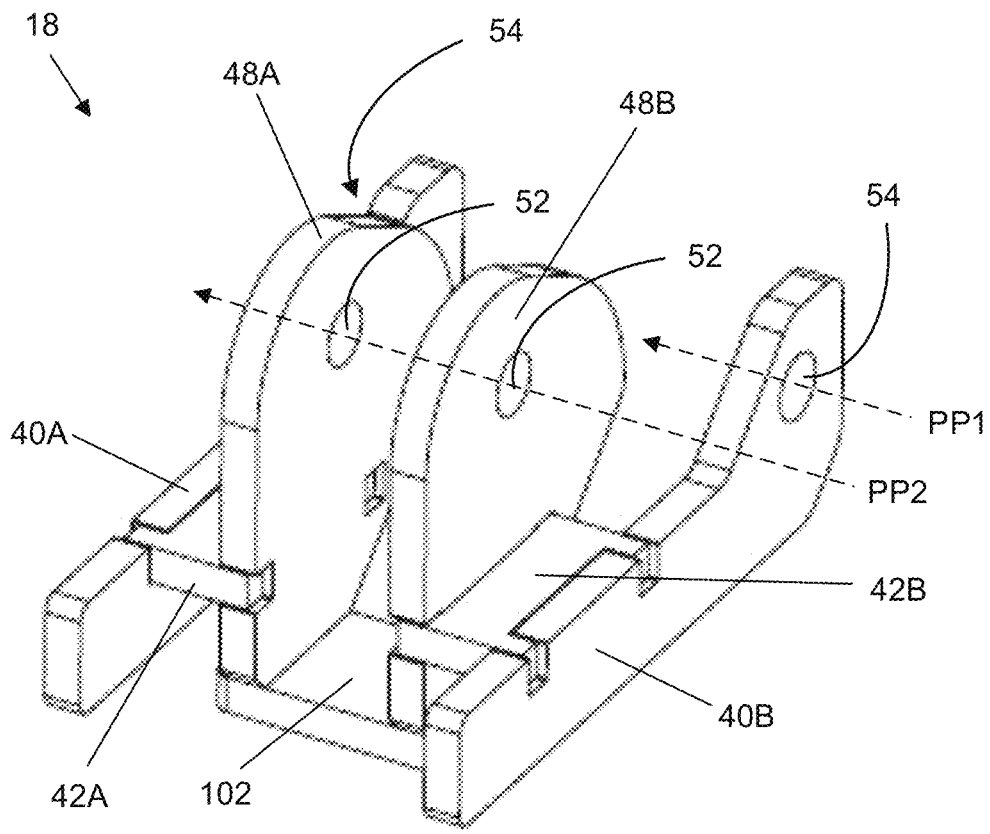
FIG. 6 illustrates one example perspective view of an example rotating bracket plate assembly.

FIG. 6 illustrates an example rotating bracket plate assembly 18. This assembly 18 is a solid piece of material such as a metal or another suitable material as understood by those of ordinary skill in the art. The rotating bracket plate assembly 18 has a pair of outer side walls 40A, 40B, a pair of I-shaped inner walls 42A, 42B, a pair of rotating latch inner walls 48A, 48B, and a latch plate 102. These components may be machined/manufactured separately and then attached buy welding or by another suitable way. In some configurations, the overall dimensions of the rotating bracket plate assembly 18 may be about 6×2×3.8 inches. Holes 54 pass through upper extending back ends of the outer side walls 40A, 40B to provide a way to pass the pivot cylinder 20 through the outer side walls 40A, 40B to create the pivot point PP1. Holes 52 pass through upward ends of the rotating latch inner walls 48A, 48B to created pivot point PP2 wherein the actuator is attached to the rotating bracket plate assembly 18.

Figure 7A:
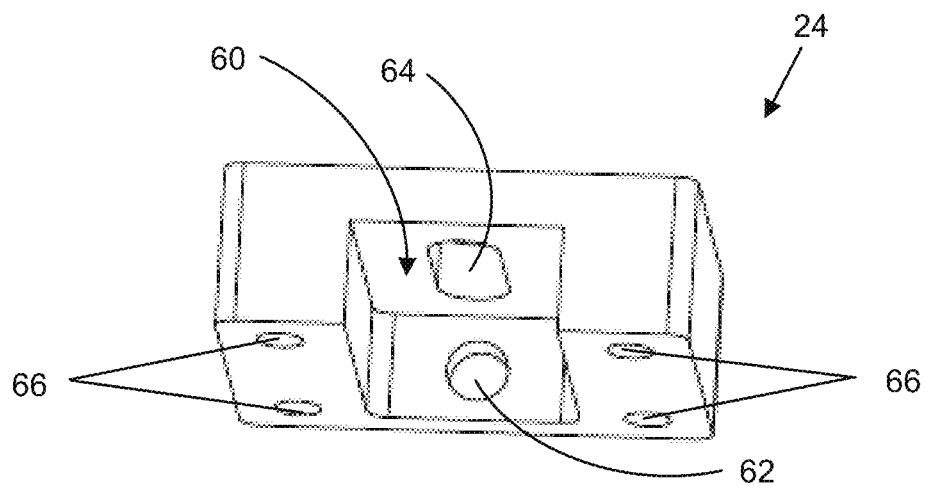
FIGS. 7A and 7B illustrate example perspective views of an example slide lock guide.
Figure 7B:
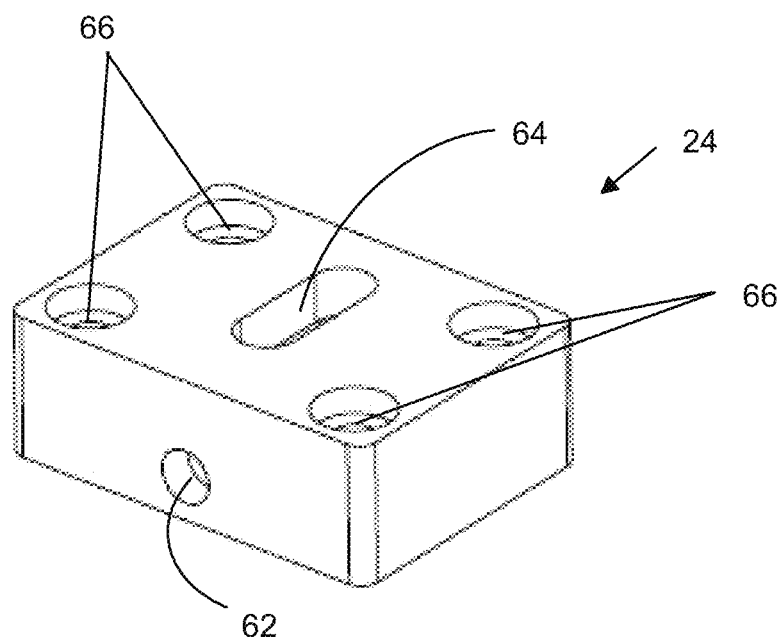

FIG. 7 illustrates an example slide lock guide 24. The slide lock guide 24 is a solid piece of material such as a metal. In some configurations, the slide lock guide 24 may be generally rectangular in shape with a size of about 2.875×1.875×1.00 inches. The slide lock guide 24 has a generally rectangular shaped cutout portion 60 into which the slide lock latch 100 may be slidably inserted. A round opening 62 is formed in a front wall of the slide lock guide 24 to allow the slide lock arm 22 freedom to move while connected to the slide lock latch 100 within the slide lock guide 24. An upper open elongated channel 64 is formed in the slide lock guide 24 to provide an opening for a connector device (e.g., a bolt) to be attach to the slide lock arm 22 to the slide lock latch 100 and still provide slidable movement of the slide lock latch 100 within the slide lock guide 24. Four openings 66 with recessed upper portions allow for four bolts or other fasting device to be used to attach the slide lock guide 24 onto the base plate 30 of the door mount assembly 16.

FIG. 8 illustrates an example slide lock latch 100. The slide lock latch 100 is a solid piece of material such as a metal. In some configurations, the slide lock latch 100 may be generally rectangular in shape with a size of about 1.9×1.25×0.625 inches. The slide lock latch 100 has two main portions that include a generally rectangular main body portion 70 and a beveled front end portion 72. The slide lock latch 100 has a generally rectangular shaped cutout portion 74 as well as a round opening 76 into which the slide lock arm 22 is inserted. A bolt or other fasting device may be inserted into an upper round opening 78 to contact the slide lock arm 22 to attach it to the slide lock latch 100.

In some embodiments, the main components of the armored vehicle door quick-release mechanism 5 such as the door mount assembly 16 and the rotating bracket plate assembly 18 may be fabricated out of common flat steel stock that may be cut, shaped, and welded as illustrated and discussed above. Some of the other components of the armored vehicle door quick-release mechanism 5 may be implemented with commercial of the shelf (COTS) parts allowing for rapid production of the armored vehicle door quick-release mechanism 5 and its rapid attachment to current vehicles of the United States Army to quickly save solder and crew-member lives.

Figure 3:
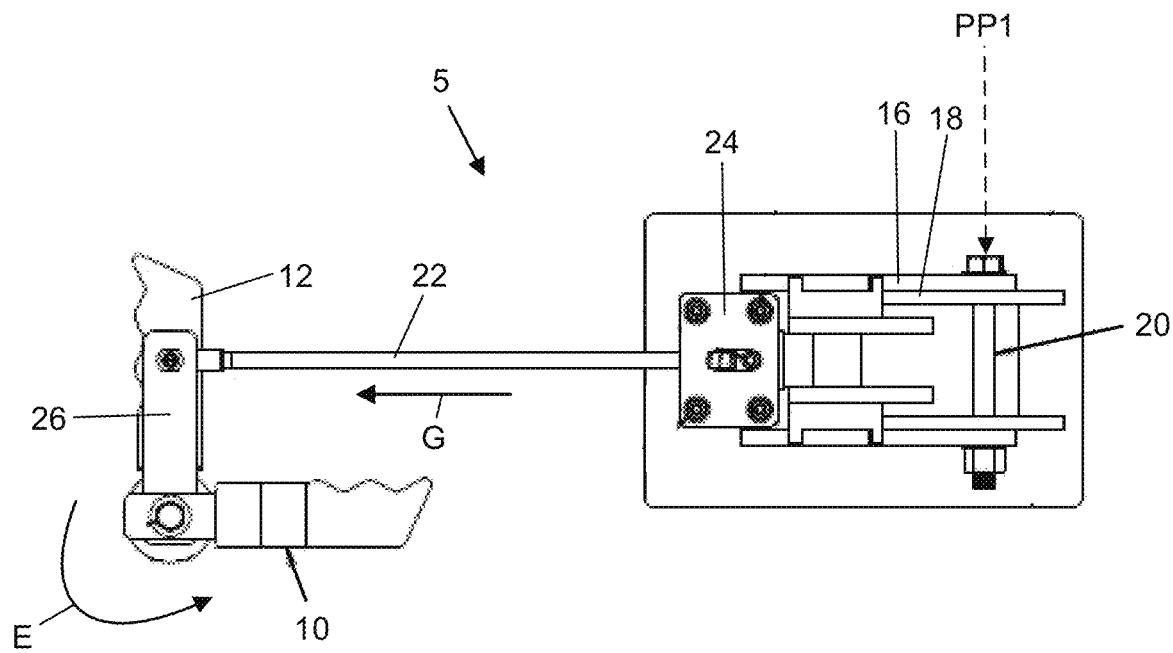
FIG. 3 illustrates an example side view of the armored vehicle door quick-release mechanism.
Figure 9:
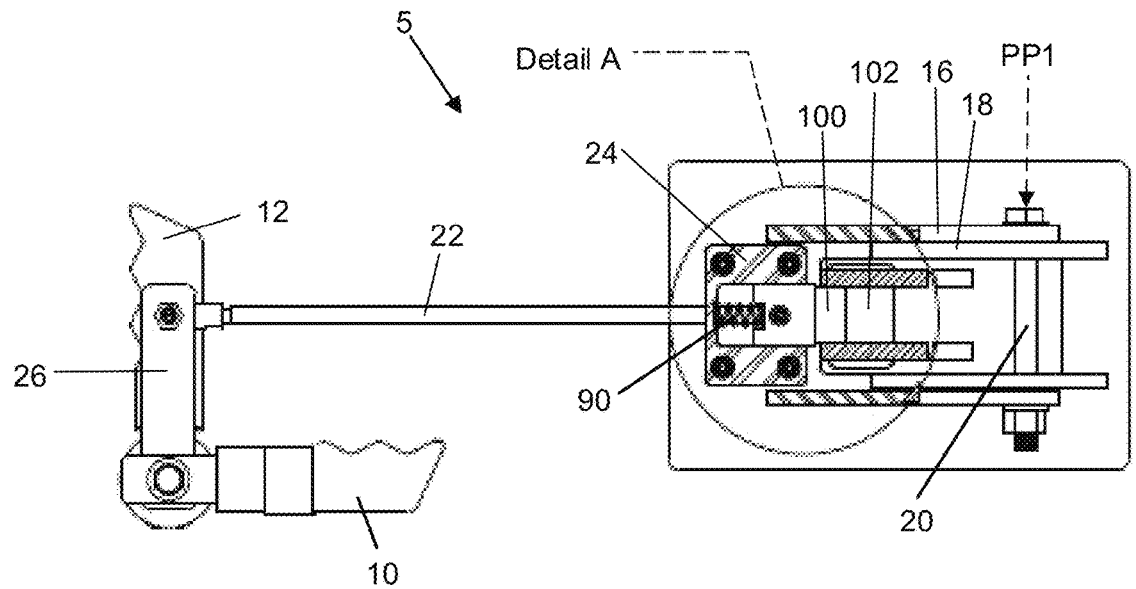
FIG. 9 illustrates one example cross-sectional view of the armored vehicle door quick-release mechanism.
Figure 10:
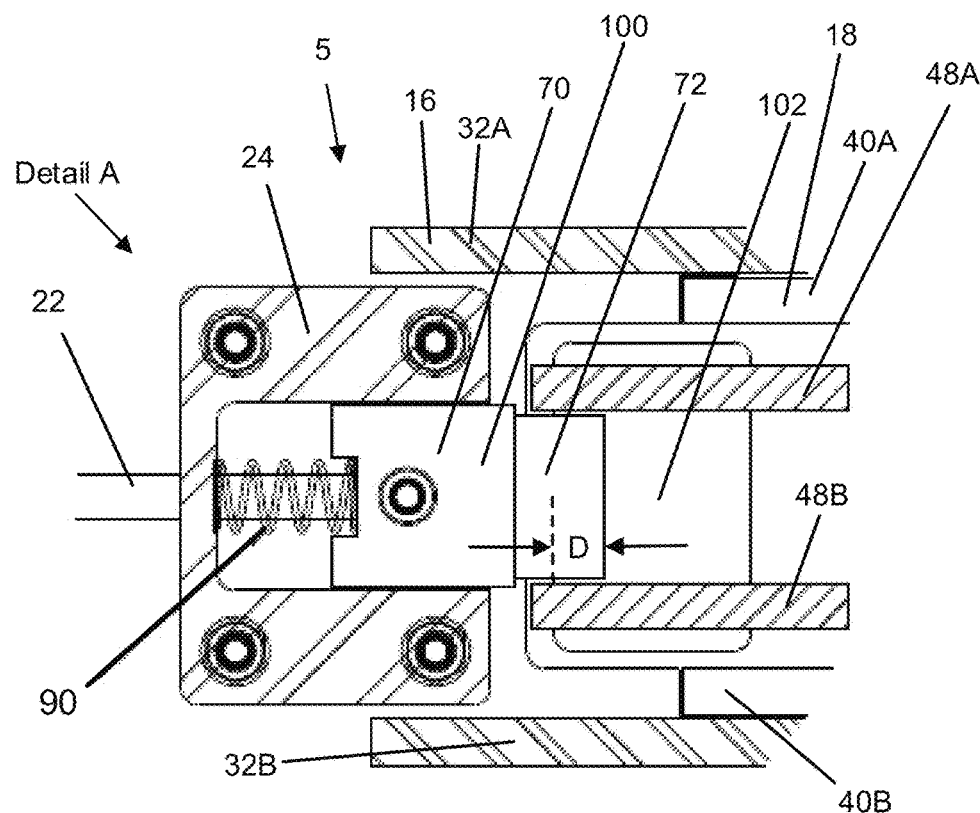
FIG. 10 illustrates a detailed view of the armored vehicle door quick-release mechanism of FIG. 9.

FIG. 9 illustrates a cross-sectional view of FIG. 3 taken through the slide lock guide 24, the slide lock arm 22, and the slide lock latch 100. FIG. 10 is a detailed view of a portion of FIG. 9. FIGS. 9 and 10 illustrate the armored vehicle door quick-release mechanism 5 in the locked position and being biased to this position by a slide lock latch spring 90. In this position, the actuator 28 is mechanically attached to the armored vehicle door quick-release mechanism 5 and is used to open and close the door 3 of the armored military vehicle 50. Notice that when the armored vehicle door quick-release mechanism 5 is locked a portion of the latch plate 102 overlaps the slide lock latch 100. In FIG. 10 the locked overlap portion has a thickness of "D". As long as the armored vehicle door quick-release mechanism 5 is in this locked position, the actuator 28 may be used to repeatedly open and close the door 3 of the armored military vehicle 50, as normal, while the latch plate 102 of armored vehicle door quick-release mechanism 5 overlaps the slide lock latch 100.

However, if a power system such as an engine of the armored vehicle 50 becomes disabled, the actuator 28 may become disabled due to lack of power. Of course, the actuator 28 may become disable at any time for other reasons. When the actuator 28 is disabled, the door 3 may become locked in a closed position by the disabled/frozen actuator 28. In these situations, the armored vehicle door quick-release mechanism 5 may be used to "unlock"/disengage the door 3 from the actuator system to allow crew members to manually open the door 3.

To "unlock" the actuator 28 from the door 3 to allow for manual/mechanical opening of the door 3, the armored vehicle door quick-release mechanism 5 is "unlocked". This is done by moving/rotating either the inside handle 10 or the outside handle 12 in the direction of arrow E (FIG. 3) which causes the slide lock arm 22 to move in the direction of arrow G to pull the slide lock latch 100 from latch plate 102 so that there is no longer any of the overlap "D" of FIG. 10. Once the overlap between the slide lock latch 100 from latch plate 102 is removed, the door is de-coupled from the rotating bracket plate assembly 18 and the actuator 28 so that the door 3 may be manually or mechanically opened without requiring assistance from of the actuator 28 and without the rotating bracket plate assembly 18 needing to rotate the door to the open position. Because the armored vehicle door quick-release mechanism 5 allows the door 3 of the armored military vehicle 50 to be rapidly opened, lives of crew members inside the vehicle 50 may be saved at an increased rate over vehicles without the armored vehicle door quick-release mechanism 5.

In "normal" operations the armored vehicle door quick-release mechanism 5 is in the locked position with the slide lock latch 100 overlapping the latch plate 102 so that there is preferably overlap of "D" or so as illustrated in FIGS. 9 and 10. If the armored vehicle door quick-release mechanism 5 is not in the locked position, but it is in an open position such as in FIG. 11 with the latch plate 102 withdrawn from the opening 34 formed in the base plate 30 of the door mount assembly 16, the actuator 28 may first be used to move the latch plate 102 into the opening 34. To accomplish this, the actuator 28 is extended to rotate the rotating bracket plate assembly 18 so that the latch plate 102 is pushed outward toward where the opening 34 formed in the base plate 30 is located. If the slide lock latch 100 still is not overlapped by the latch plate 102, then the door may be manually pushed until the latch plate 102 slide past the beveled front end portion 72 of the slide lock latch 100 and the slide lock latch 100 is pushed under the latch plate 102 by the slide lock latch spring 90 and held in this position by the spring 90. In this locked position, the actuator 28 may be contracted to rotate the rotating bracket plate assembly 18 about pivot point PP1 so that the rotating bracket plate assembly 18 and the door mount assembly 16 combine to close the door 3.

Figure 11:
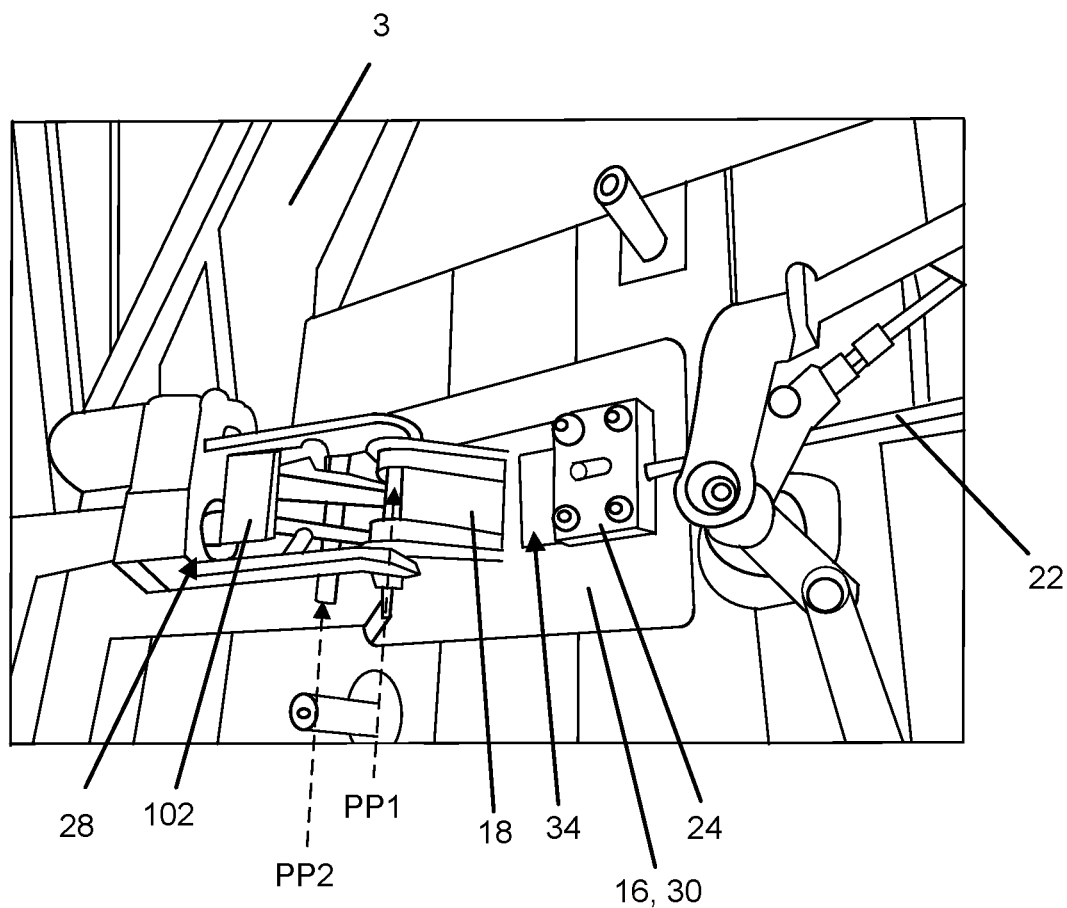
FIG. 11 illustrates an example view of the armored vehicle door quick-release mechanism mounted on a military vehicle door.

The door 3 can be opened when the door quick-release mechanism 5 is in the locked position by extending the actuator 28 so that the rotating bracket plate assembly 18 is rotated about pivot point PP1 so that the rotating bracket plate assembly 18 and the door mount assembly 16 combination combine to open the door 3. During an opening of the door in this manner, the rotating bracket assembly 18 and its latch plate 102 will rotate approximately 180 degrees about pivot point PP1 so that the latch plate 102 moves from an adjacent position beside the slide lock guide 24 and rotates about 180 degrees to an adjacent position near the actuator 28. In other words, the second pivot point PP2 moves from reward the first pivot point PP1 (FIG. 2) to a position forward of the first pivot point (FIG. 11). Here the terms "rearward" and "forward" mean "forward" as in the normal driving direction of the armored vehicle 50 and rearward as behind the forward position or "toward the rear" of the armored vehicle 50. In some embodiments, the shapes of the door mount assembly 16 and/or the rotating bracket assembly 18 may allow the for the weight of the door 3 to hold the door 3 open when it has been opened beyond a maximum open position that in some cases may be beyond rotating the rotating bracket assembly 18 beyond 180 degrees, as understood by those of ordinary skill in the art.

Notice that the movement of the rotating bracket assembly 18 is similar whether opening the door 3 by operating the actuator 28 with power or manually opening the door 3 after mechanically disengaging the actuator 28 (upon power failure) using the door quick-release mechanism 5. When the actuator 28 is powered, as discussed above, the actuator 28 rotates the rotating bracket assembly 18 and its latch plate 102 approximately 180 degrees about pivot point PP1 so that that the latch plate 102 moves from and adjacent position beside the slide lock guide 24 to an adjacent position near the actuator 28. In other words, the second pivot point PP2 moves from reward the first pivot point PP1 (FIG. 2) to a position forward of the first pivot point (FIG. 11). However, when the actuator is unpowered, this movement is accomplished without the actuator contracting. Without power, the actuator 28 stay ridged and of a similar length. This is movement is made possible in both the unpowered and powered situation due to the location of the first pivot point PP1 and the second pivot point PP2 and the geometries of at least the door mount assembly 16 and the rotating bracket assembly 18. These geometries allow the door to open if the door is being opened by the actuator 28 or if the door is opened manual with a non-responsive actuator 28.

Methods that can be implemented in accordance with the disclosed subject matter, may be at least partially implemented with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g. device, system, process, component, and so forth). Additionally, it should be further appreciated that in some embodiments the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 12:
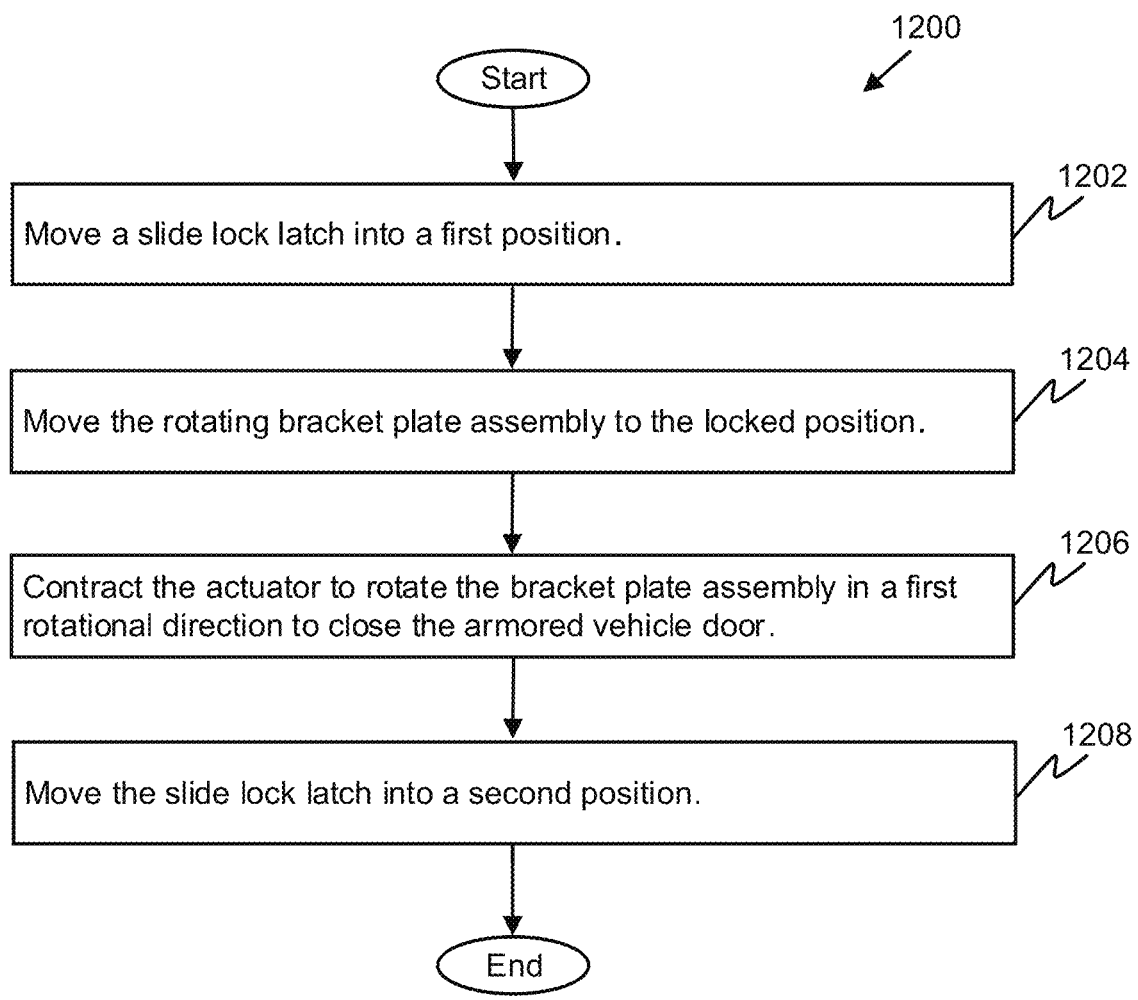
FIG. 12 illustrates an example method of quick-releasing an armored vehicle door from an actuator.

FIG. 12 illustrates a method 1200 of quick-releasing an armored vehicle door from an actuator. The method 1200 begins by moving a slide lock latch into a first position, at 1202, so that the slide lock latch is adapted to lock the armored vehicle door to a rotating bracket plate assembly in a locked position. In the locked position the slide lock latch overlaps a bracket plate of the rotating bracket plate assembly. In some embodiments, the slide lock latch is biased toward the first position using a compression spring. The rotating bracket plate assembly is moved, at 1204, to the locked position with the slide lock latch overlapping the bracket plate. When the slide lock latch is in the first position and the locked position, the actuator is contracted, at 1206, to rotate the bracket plate assembly in a first rotational direction to close the armored vehicle door. At 1208, the slide lock latch is moved into a second position to disconnect the armored vehicle door from the rotating bracket plate assembly. In the second position the slide lock latch does not overlap the bracket plate and the armored vehicle door is disconnected from the actuator. Later, the actuator may be expanded, when the slide lock latch is in the first position, to rotate the bracket plate assembly in the second rotational direction to open the armored vehicle door.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims. Accordingly, the disclosure is intended to embrace all such alterations, modifications, and variations that fall within the scope of this application, including the appended claims.

Moreover, the description and illustration of the invention is an example and the invention is not limited to the exact details shown or described. References to "the preferred embodiment", "an embodiment", "one example", "an example" and so on, indicate that the embodiment(s) or example(s) so described may include a particular feature, structure, characteristic, property, element, or limitation, but that not every embodiment or example necessarily includes that particular feature, structure, characteristic, property, element, or limitation. Additionally, references to "the preferred embodiment", "an embodiment", "one example", "an example" and the like, are not to be construed as preferred or advantageous over other embodiments or designs. Rather, use of the words "the preferred embodiment", "an embodiment", "one example", "an example" and the like are intended to present concepts in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An armored vehicle door quick-release mechanism comprising:
    a handle;
    a handle plate;
    a slide lock arm;
    a slide lock latch;
    a slide lock guide adapted to guide a movement of the slide lock latch;
    wherein the armored vehicle door quick-release mechanism is adapted to quick release an armored vehicle door on an armored military vehicle from a vehicle power system that is used to open and close the armored vehicle door on the armored military vehicle;
    wherein the handle is coupled to the handle plate and the handle plate is rotatably coupled to the slide lock arm and the slide lock arm is attached to the slide lock latch, wherein a rotation of the handle in a first direction causes that slide lock latch to move in the first direction to a first position at least partially within the slide lock guide, and wherein a rotation of the handle in a second direction causes that slide lock latch to move in a second direction to a second position at least partially within the slide lock guide; and
    wherein when the slide lock latch is in the first position the armored vehicle door quick-release mechanism is adapted to couple the armored vehicle door on the armored military vehicle to the vehicle power system in a locked position that prevents manual opening and closing of the armored vehicle door on the armored military vehicle, and wherein when the slide lock latch is in the second position the armored vehicle door quick-release mechanism is uncoupled from the armored vehicle door on the armored military vehicle to allow manual opening and closing of the armored vehicle door on the armored military vehicle without the armored vehicle door coupled to the vehicle power system.

2. The armored vehicle door quick-release mechanism of claim 1 further comprising:
    a latch plate adapted to be moved by the vehicle power system, and wherein in the locked position the slide lock latch and the latch plate adjacently overlap.

3. The armored vehicle door quick-release mechanism of claim 2 further comprising
    a door plate that is generally planer and adapted to be mounted to the armored vehicle door of the armored military vehicle, and wherein the slide lock guide is mounted to the door plate.

4. The armored vehicle door quick-release mechanism of claim 2 further comprising:
    an actuator coupled to the vehicle power system and adapted to move the latch plate.

5. The armored vehicle door quick-release mechanism of claim 4 further comprising:
    a rotating bracket plate assembly pivotally attached to the actuator, and wherein the rotating bracket plate assembly rotatably moves the latch plate.

6. The armored vehicle door quick-release mechanism of claim 5 wherein the door plate further comprises:
    a pair of flanges extending outward from a base of the door plate; and
    a pivot point passing through the flanges and the rotating bracket plate assembly, wherein the rotating bracket plate assembly rotates at the pivot point with respect to the door plate.

7. The armored vehicle door quick-release mechanism of claim 2 wherein the door plate further comprises:
    a generally rectangular shaped opening, and wherein when in the locked position the latch plate is at least partially within the opening.

8. The armored vehicle door quick-release mechanism of claim 3 further comprising:
    a spring adapted to bias the slide lock latch toward the locked position.

9. The armored vehicle door quick-release mechanism of claim 1 wherein the slide lock latch further comprises:
    a beveled front end adapted to allow the latch plate to push the slide lock latch away from the latch plate to allow the latch plate to slip beneath the slide lock latch to create and overlap between the slide lock latch and the latch plate.

10. The armored vehicle door quick-release mechanism of claim 1 further comprising:
    a hydraulic actuator coupled to the vehicle power system and adapted to move the latch plate.

11. The armored vehicle door quick-release mechanism of claim 1 further wherein the handle is an inside handle and further comprising:
    an outside handle outside the armored vehicle door coupled to the inside handle wherein both the inside handle and the outside handle are coupled to the handle plate.

12. The armored vehicle door quick-release mechanism of claim 1 wherein the armored military vehicle is at least one of the group consisting of: an Abrams tank, a Bradley fighting vehicle, a Stryker vehicle, an armored personnel carrier, a high mobility multipurpose wheeled vehicle (Hummvee), a light armored vehicle (LAV), a combat support vehicle, a mine-protected vehicle, a utility vehicle, a Mine Resistant Ambush Protected (MRAP) vehicle, and a truck.

13. An armored vehicle door quick-release mechanism comprising:
    a handle;
    a slide lock latch;
    an actuator mechanism; and wherein the handle is coupled to the slide lock latch, wherein movement of the handle in a first direction causes that slide lock latch to move in a first direction to a first position so that the slide lock latch is adapted to attach an armored vehicle door to the actuator mechanism adapted to open and close the vehicle door, and wherein a movement of the handle in a second direction causes that slide lock latch to move in a second direction to a second position to detach the armored vehicle door from the actuator mechanism.

14. The armored vehicle door quick-release mechanism of claim 13 wherein the actuator mechanism further comprising:
   an actuator; and
   a rotating bracket plate assembly rotatably attached to the actuator, wherein in the first position the slide lock latch is engaged with the rotating bracket plate assembly, and wherein in the second position the slide lock latch is detached from the rotating bracket plate assembly.

15. The armored vehicle door quick-release mechanism of claim 13 further comprising:
   a door mount assembly adapted to be mounted to the armored vehicle door, wherein the door mount assembly further comprises:
   at least one outward extending flange, wherein the rotating bracket plate assembly is rotatably mounted to the at least one flange, and wherein the rotating bracket plate assembly further comprises:
   a bracket plate adapted to be rotated by the rotating bracket plate assembly, wherein in the first position the slide lock latch overlaps the bracket plate, and wherein in the second position the bracket plate and the slide lock latch do not overlap.

16. The armored vehicle door quick-release mechanism of claim 14 wherein the rotating bracket rotates in a path of movement to open the armored vehicle door when the actuator is powered and, wherein the rotating bracket rotates in the same path of movement to open the armored vehicle door when the actuator is not powered.

17. The armored vehicle door quick-release mechanism of claim 13 further comprising:
   a spring adapted to bias the slide lock latch toward the first position.

18. A method of quick-releasing an armored vehicle door from an actuator comprising moving a slide lock latch into a first position so that the slide lock latch is adapted to lock the armored vehicle door to a rotating bracket plate assembly in a locked position, wherein in the locked position the slide lock latch overlaps a bracket plate of the rotating bracket plate assembly;
   moving the rotating bracket plate assembly to the locked position with the slide lock latch overlapping the bracket plate;
   contracting the actuator, when the slide lock latch is in the first position and is in the locked position, to rotate the rotating bracket plate assembly in a first rotational direction to close the armored vehicle door; and
   moving a slide lock latch into a second position to disconnect the armored vehicle door from the rotating bracket plate assembly, wherein in the second position the slide lock latch does not overlap the bracket plate.

19. The method of quick-releasing an armored vehicle door from an actuator of claim 18 further comprising:
   expanding the actuator, when the slide lock latch is in the first position, to rotate the bracket plate assembly in second rotational direction to open the armored vehicle door.

20. The method of quick-releasing an armored vehicle door from an actuator of claim 18 further comprising:
   biasing the slide lock latch toward the first position using a compression spring.

* * * * *